(12) United States Patent
Basso et al.

(10) Patent No.: US 8,959,224 B2
(45) Date of Patent: Feb. 17, 2015

(54) NETWORK DATA PACKET PROCESSING

(75) Inventors: Claude Basso, Nice (FR); Jean L. Calvignac, Raleigh, NC (US); Hubertus Franke, Cortlandt Manor, NY (US); Eren Kursun, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/299,045

(22) Filed: Nov. 17, 2011

(65) Prior Publication Data

US 2013/0132535 A1 May 23, 2013

(51) Int. Cl.
*G06F 15/173* (2006.01)
*G06F 9/46* (2006.01)
*G06F 1/32* (2006.01)
*G06F 9/50* (2006.01)

(52) U.S. Cl.
CPC ............ *G06F 1/3209* (2013.01); *G06F 9/5094* (2013.01)
USPC .......................................... 709/226; 718/104

(58) Field of Classification Search
USPC ........... 718/102–105; 709/223–226, 201–203
See application file for complete search history.

(56) References Cited

U.S. PATENT DOCUMENTS

| | | | |
|---|---|---|---|
| 6,947,430 B2 | 9/2005 | Bilic et al. | |
| 7,412,353 B2 | 8/2008 | Borkar et al. | |
| 7,990,974 B1 | 8/2011 | Gmuender et al. | |
| 8,074,110 B2 * | 12/2011 | Vera et al. | 714/11 |
| 8,213,305 B2 * | 7/2012 | Raghunath et al. | 370/230 |
| 2002/0038339 A1 | 3/2002 | Xu | |
| 2002/0116644 A1 | 8/2002 | Richard | |
| 2004/0215987 A1 * | 10/2004 | Farkas et al. | 713/300 |
| 2007/0074011 A1 | 3/2007 | Borkar et al. | |
| 2010/0037234 A1 * | 2/2010 | Udupa et al. | 718/107 |
| 2010/0229013 A1 | 9/2010 | Diab et al. | |
| 2011/0213947 A1 | 9/2011 | Mathieson et al. | |
| 2012/0198466 A1 * | 8/2012 | Cherkasova et al. | 718/104 |
| 2013/0054179 A1 * | 2/2013 | Shapira et al. | 702/117 |

FOREIGN PATENT DOCUMENTS

| | | |
|---|---|---|
| CN | 101442460 A | 5/2009 |
| WO | WO2010129516 A1 | 11/2010 |

OTHER PUBLICATIONS

Hull et al., "Mitigating Congestion in Wireless Sensor Networks," SenSys '04 Proceedings of the 2nd International Conference on Embedded Networked Sensor Systems, Nov. 2004, pp. 134-147.

(Continued)

*Primary Examiner* — Chirag R Patel
(74) *Attorney, Agent, or Firm* — Yee & Associates, P.C.; Jennifer R. Davis

(57) ABSTRACT

A method and apparatus for processing of data packets by a data processing component comprising a plurality of processing resources. A metric value for a current configuration of the processing resources that are processing the data packets is identified. A new configuration of the processing resources is selected using the metric value. The current configuration of the processing resources is changed to the new configuration and data packets are distributed to the new configuration for processing as the data packets are received.

20 Claims, 4 Drawing Sheets

(56) References Cited

OTHER PUBLICATIONS

Hou et al., "Efficient Data Streaming with On-chip Accelerators: Opportunities and Challenges," IEEE 17th International Symposium on High Performance Computer Architecture, Feb. 2011, pp. 312-320.

Franke et al., "Introduction to the wire-speed processor and architecture," IBM Journal of Research & Development, vol. 54, No. 1, Paper 3, Jan.-Feb. 2010, pp. 3:1-3:11.

Zhao et al., "Understanding Packet Delivery Performance in Dense Wireless Sensor Networks," SenSys '03 Proceedings of the 1st international conference on Embedded networked sensor systems, Nov. 2003, pp. 1-13.

Zhu et al., "VoIP performance on multicore platforms," IBM Journal of Research & Development, vol. 54, No. 1, Paper 10, Jan.-Feb. 2010, pp. 10:1-10:15.

Deri, "nCap: Wire-speed Packet Capture and Transmission," Proceedings of the IEEE/IFIP Workshop on End-to-End Monitoring Techniques and Services, May 2005, pp. 47-55.

UK search report dated Mar. 22, 2013 regarding application GB1219658.0, reference YOR920110610GB1, applicant International Business Machines Corporation (6 pages).

Examination Report, dated Feb. 11, 2014, regarding Application No. GB1219658.0, 2 pages.

Response to Official Letter, dated Apr. 4, 2014, regarding Application No. GB1219658.0, 8 pages.

Sarood et al., "A 'Cool' Load Balancer for Parallel Applications," Proceedings of 2011 International Conference for High Performance Computing, Networking, Storage and Analysis (SC'11), Nov. 2011, 11 pages.

Tang et al., "Energy-Efficient Thermal-Aware Task Scheduling for Homogeneous High-Performance Computing Data Centers: A Cyber-Physical Approach," IEEE Transactions on Parallel and Distributed Systems, vol. 19, No. 11, Nov. 2008, pp. 1458-1472.

* cited by examiner

NETWORK DATA PACKET PROCESSING

BACKGROUND

1. Field

The present disclosure relates generally to data processing networks and, in particular, to processing data packets in data processing networks. Still more particularly, the present disclosure relates to directing data packets to processing resources in a network data processing component for processing in a more effective manner.

2. Description of the Related Art

In data processing networks, digital data is transported between endpoints of the network for processing. For example, without limitation, the Internet and network data centers are examples of such data processing networks. The endpoints of the data processing network may include computers or other data processing devices for processing digital data in a variety of ways to perform a variety of functions. The types of processes that may be performed on or using digital data at the endpoints of a data processing network are virtually limitless.

In many data processing networks, digital data is transported on the network in the form of data packets. A data packet is a formatted unit of data that is used by computers or other data processing devices to communicate with each other via the network. Some computers and networks do not use data packets to communicate, but most currently do, including nearly all computers on the Internet. The use of data packets allows many computers or other data processing devices on a network to communicate more quickly and easily.

In addition to the processing of data packets at the endpoints of a data processing network, data packets may be processed by inline processors on the network. The inline processors may be located between the endpoints on the network. Whereas endpoints of the network may be said to use or consume data, inline processors filter or modify data on the network and send it on. Intrusion detection systems, routers, enterprise buses, and firewalls are examples, without limitation, of such inline processors.

Endpoint and inline data processing on a network may be implemented using data processing components that provide multiple independent data processing resources. The multiple independent data processing resources provided by a single data processing component of this type may be data processing units that independently read and execute program instructions. For example, the independent data processing resources on a single data processing component may be independent processors. These independent data processing resources on the data processing component may be referred to as cores. Manufacturers may integrate multiple cores onto a single integrated circuit die or onto multiple dies in a single chip package to form a data processing component providing multiple independent data processing resources. Multi-core processors are widely used across many applications, including, without limitation, general-purpose computing, embedded computing, networking functions, digital signal processing, and graphics.

In cases where a multi-core processor is used to process data packets, data packets to be processed by the data processing component must be directed to the individual cores for processing. Various processes and devices may be used to direct data packets for processing by individual processor cores of a multi-core processor. Such processes and devices may employ various rules for directing data packets for processing by the individual processor cores. Such rules may direct data packets for processing by the processor cores in a manner that takes advantage of the processing resources available on the multi-core processor to process the data packets quickly and efficiently. For example, without limitation, such a rule for directing data packets may specify that newly received data packets be directed to processor cores on the multi-core processor that are less busy than other processor cores on the multi-core processor. An Ethernet adaptor is one example, without limitation, of a device that may implement such rules for directing data packets for processing by individual processor cores on a multi-core processor to achieve processing efficiency.

Other rules for directing data packets for processing by individual processor cores on a multi-core processor may attempt to achieve other types of processing efficiency. For example, to improve energy efficiency, a certain number of active processor cores on the multi-core processor may be turned off while a number of inactive processor cores on the multi-core processor are turned on. Data packet processing then may be shifted from the processor cores that are turned off to other processor cores on the multi-core processor that remain or are turned on. Individual processor cores will heat up while processing data packets. Hotter cores use more energy for processing than cooler cores. Therefore, shifting data processing from hotter active cores to cooler inactive cores can potentially reduce overall energy consumption by the multi-core processor. However, improvement of such methods to better optimize the efficiencies that may be achieved is desirable.

Wire-speed processing refers to the processing of data packets by a data processing component at a processing speed to achieve throughput that matches or approaches the hypothetical peak physical layer net data rate of the communications media carrying the data packets in a network. For example, without limitation, the communications media carrying the data packets in a network may be copper wires, fiber-optic cables, wireless media, or other media or combinations of media for carrying data packets in the network. Long delays in the processing of data packets cannot be tolerated in a wire-speed processing environment.

Accordingly, it would be advantageous to have a method and apparatus that takes into account one or more of the issues discussed above, as well as possibly other issues.

SUMMARY

In one illustrative embodiment, a method for processing data packets is provided. A metric value for a current configuration of processing resources in a data processing component that is processing the data packets is identified. A new configuration of the processing resources in the data processing component is selected using the metric value. The current configuration of the processing resources in the data processing component is changed to the new configuration. The data packets are then distributed to the new configuration of the processing resources for processing as the data packets are received.

In another illustrative embodiment, an apparatus comprises a data processing component and a data packet distributor. The data processing component comprises a plurality of processing resources configured to process data packets. The data packet distributor is configured to identify a metric value for a current configuration of the processing resources in the data processing component that is processing the data packets, to select a new configuration of the processing resources in the data processing component using the metric value, to change the current configuration of the processing resources in the data processing component to the new configuration, and to distribute the data packets to the new configuration of the processing resources for processing as the data packets are received.

In yet another illustrative embodiment, a computer program product comprises a computer readable storage medium. First program instructions, second program instructions, third program instructions, and fourth program instructions are stored on the computer readable storage medium. The first program instructions are for identifying a metric value for a current configuration of processing resources in a data processing component that is processing the data packets. The second program instructions are for selecting a new configuration of the processing resources in the data processing component using the metric value. The third program instructions are for changing the current configuration of the processing resources in the data processing component to the new configuration. The fourth program instructions are for distributing the data packets to the new configuration of the processing resources for processing as the data packets are received.

Further objects, features, and advantages will be apparent from the following detailed description and the attached drawing figures.

DETAILED DESCRIPTION

The different illustrative embodiments recognize and take into account a number of different considerations. A "number", as used herein with reference to items, means one or more items. For example, "a number of different considerations" means one or more different considerations.

The different illustrative embodiments recognize and take into account that the volume of data packet arrival at a data processing component in a data processing network may typically fluctuate, even over a very short period of time. This fluctuation in the rate of data packet arrival over time is known as burstiness. The fluctuation of data packet arrival at a data processing component may be taken advantage of to achieve power and energy savings. For example, data packet processing workloads may be shifted among the processing resources of the data processing component based on the current demand for data packet processing to reduce the number of processing resources in use. Unused data processing resources in the data processing component then may be turned off to achieve power and energy savings.

The different illustrative embodiments recognize and take into account that, in wire-speed processing environments, the processing associated with the arrival of a data packet is, by nature, relatively short. For example, the processing of a data packet by a data processing component operating in a wire-speed operating environment may be completed in microseconds. Furthermore, the processing of data packets in a wire-speed processing environment is typically relatively uniform among received data packets. Therefore, the processing of data packets in a wire-speed processing environment typically exhibits relatively small power variations among different work items.

Figure 1:
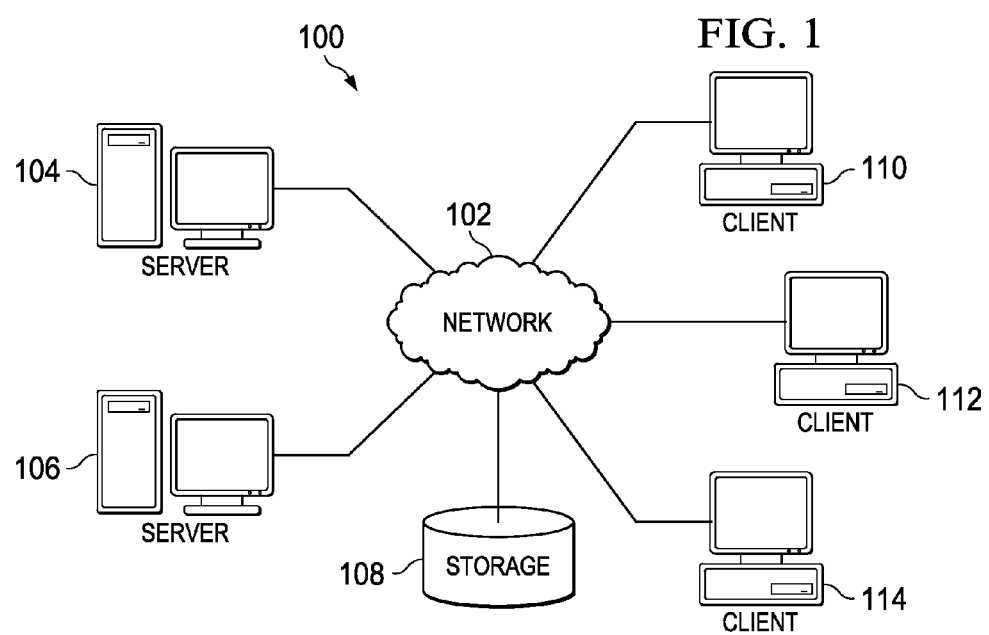
FIG. 1 is a pictorial representation of a network of data processing systems in which illustrative embodiments may be implemented.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Digital data may be transported across network data processing system 100 in the form of data packets. Data packets transported via network 102 may be processed by network endpoints, such as server computers 104 and 106 and client computers 110, 112, and 114. Furthermore, data packets may be processed by inline processors on network 102. Inline processors may be located between the endpoints on network 102. As discussed above, whereas endpoints of network data processing system 100 may be said to use or consume data, inline processors filter or modify data on network 102 and send it on.

Figure 2:
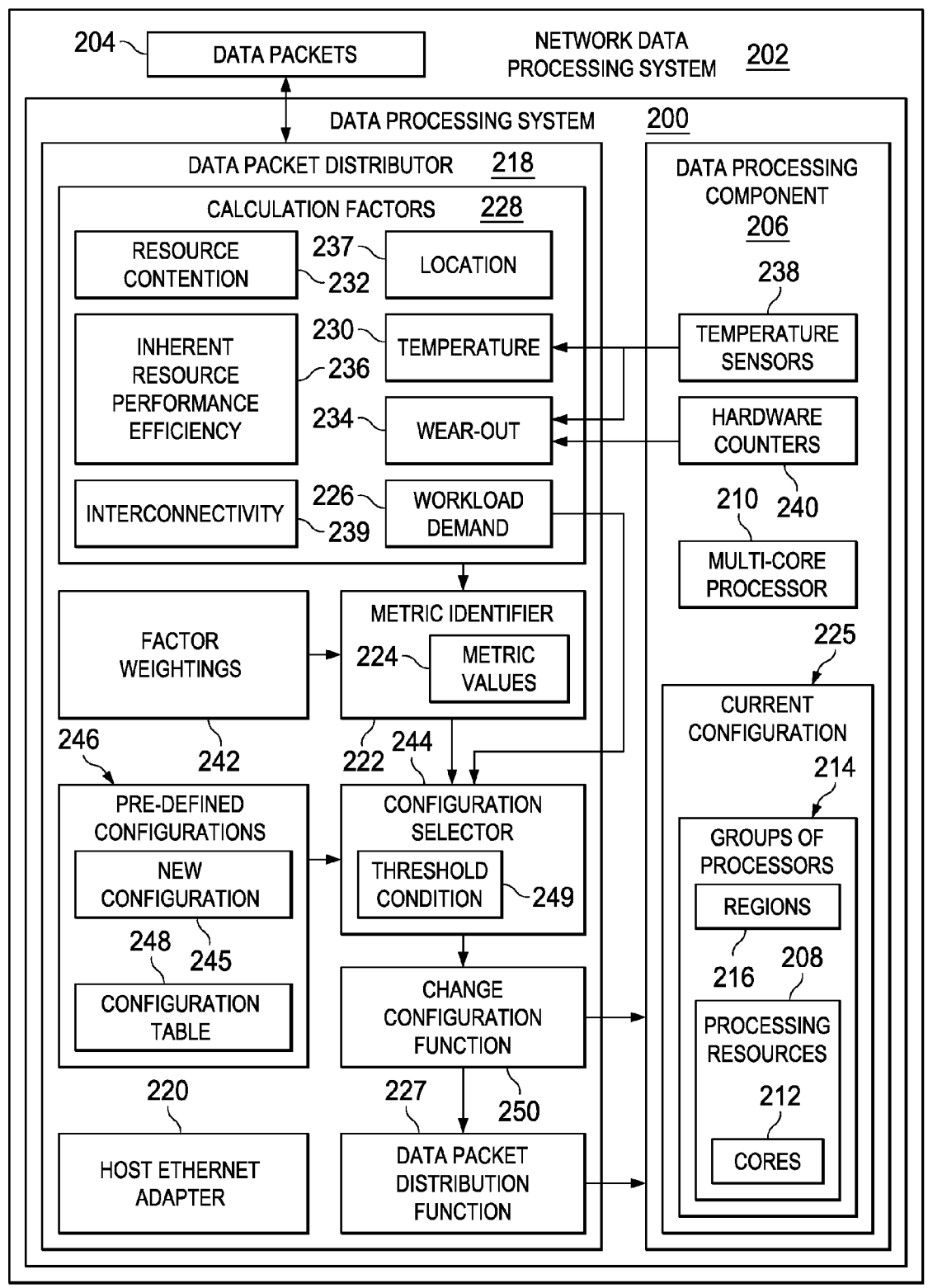
FIG. 2 is an illustration of a data processing system for data packet processing in accordance with an illustrative embodiment.

Turning now to FIG. 2, an illustration of a data processing system for data packet processing is depicted in accordance with an illustrative embodiment. Data processing system 200 is a data processing system on network data processing system 202. In this example, data processing system 200 may be one example of server computers 104 or 106 or client computers 110, 112, or 114 at the endpoints of network data processing system 100 in FIG. 1. As another example, data processing system 200 may be one example of an inline processor in network data processing system 100 in FIG. 1 or in any other network data processing system. In this illustrative example, network data processing system 202 is depicted in block diagram form.

Data processing system 200 receives data to be processed in the form of data packets 204. Data packets 204 may be sent to data processing system 200 via any network using any appropriate communications medium and communications protocol. Data packets 204 may include any type of data and may be formatted using any appropriate data format.

Data packets 204 are processed by data processing component 206 of data processing system 200. Data packets 204 may be processed by data processing component 206 of data processing system 200 to perform any desired function. For example, without limitation, data packets 204 may be processed by data processing component 206 to implement the functionality of an intrusion detection system, a router, an enterprise bus, a firewall, or any other function or combination of functions. In accordance with an illustrative embodiment, data packets 204 may be processed by data processing component 206 to provide wire-speed processing of data packets 204 by data processing system 200.

In accordance with an illustrative embodiment, data processing component 206 includes a plurality of processing resources 208. For example, processing resources 208 may be a plurality of independent processors implemented in data processing component 206. In one example, without limitation, data processing component 206 is multi-core processor 210. In this case, processing resources 208 on data processing component 206 are a plurality of cores 212. Data processing component 206 may include any number of cores 212 or other independent processing resources 208 on a single integrated circuit chip.

Processing resources 208 on data processing component 206 also may include groups of processors 214. Groups of processors 214 may include subsets of the total number of cores 212 or other processing resources 208 provided on data processing component 206. In one example, groups of processors 214 may correspond to physical regions 216 on an integrated circuit chip where the number of cores 212 forming groups of processors 214 is implemented. In another example, groups of processors 214 may correspond to nodes.

Data packets 204 received by data processing system 200 are distributed to individual processing resources 208 on data processing component 206 for processing by data packet distributor 218. For example, without limitation, data packet distributor 218 may be implemented as host Ethernet adapter 220 or as any other device for distributing data packets 204 to a plurality of processing resources 208 for processing. In accordance with an illustrative embodiment, data packet distributor 218 is configured to distribute data packets 204 to processing resources 208 on data processing component 206 to provide efficient and effective processing of data packets 204 by data processing component 206.

Data packet distributor 218 includes metric identifier 222. Metric identifier 222 identifies metric values 224 for current configuration 225 of processing resources 208 in data processing component 206. Current configuration 225 is the configuration of processing resources 208 in data processing component 206 that is currently being used to process data packets 204. In general, a configuration of processing resources 208 may include specific processing resources 208 on data processing component 206 that are turned on and active as well as other specific processing resources 208 that are turned off. Processing resources 208 that are turned on and active may be operated in various modes. Therefore, a configuration of processing resources 208 also may include the operating modes of processing resources 208 in the configuration that are on and active. Data packet distributor 218 employs data packet distribution function 227 to distribute data packets 204 to the currently active processing resources 208 as defined by current configuration 225.

Metric values 224 are numeric values that indicate a level of efficiency, reliability, or other characteristics of interest of current configuration 225 of processing resources 208 in data processing component 206 that is being used to process data packets 204. Metric values 224 may include values that indicate characteristics of interest for individual processing resources 208 or groups of processors 214 in data processing component 206. Metric values 224 also may include values for current configuration 225 of data processing component 206 as a whole. In accordance with an illustrative embodiment, metric identifier 222 may use metric values 224 to determine whether or not current configuration 225 of processing resources 208 in data processing component 206 is the most desirable configuration for processing the current workload of data packets 204 to be processed by data processing system 200.

Metric identifier 222 may identify metric values 224 based on one or more calculation factors 228. For example, without limitation, calculation factors 228 may include current workload demand 226, temperature 230, resource contention 232, wear-out 234, inherent resource performance efficiency 236, location 237, and interconnectivity 239.

Workload demand 226 is related to the overall network traffic of data packets 204 to be processed by data processing system 200. Workload demand 226 also may be related to portions of the overall workload that are directed to individual processing resources 208 in data processing component 206 in accordance with current configuration 225.

Temperature 230 is related to the temperature of data processing component 206 or to the temperature of regions 216 on data processing component 206 corresponding to processing resources 208 or groups of processors 214. Temperature 230 may be provided by one or more temperature sensors 238 on data processing component 206.

Resource contention 232 is related to the contention for use of processing resources 208 to process data packets 204 in current configuration 225. For example, resource contention 232 may be determined from the wait times or cache latency of cache memory associated with individual processing resources 208 or groups of processors 214 in data processing component 206.

Wear-out 234 is related to the useful life of individual processing resources 208 or groups of processors 214 on data processing component 206. For example, wear-out 234 may be determined based on the number of cycles that individual processing resources 208 or groups of processors 214 are in activity at activity levels that exceed an activity level threshold and temperature levels that exceed a temperature threshold. Wear-out 234 may be determined using temperature information provided by temperature sensors 238 on data processing component 206 and activity information provided by hardware counters 240 on data processing component 206.

Inherent resource performance efficiency 236 is related to the inherent performance characteristics of various processing resources 208 or groups of processors 214 on data processing component 206. Inherent resource performance efficiency 236 takes into account that different processing resources 208 or groups of processors 214 on data processing component 206 may be of different quality and may have different inherent performance characteristics.

Location 237 is related to the location of processing resources 208 on data processing component 206. For example, location 237 may take into account the relative positions of processing resources 208 on data processing component 206. Interconnectivity 239 is related to the interconnectivity of processing resources 208 on data processing component 206.

Metric identifier 222 also may use factor weightings 242 for identifying metric values 224. Factor weightings 242 are values that define the degree to which individual calculation factors 228 are taken into account by metric identifier 222 for identifying metric values 224. Factor weightings 242 thus may be used to establish the importance or priority that is to be given to individual calculation factors 228 for identifying metric values 224 for any particular application.

In accordance with an illustrative embodiment, workload demand 226 and metric values 224 may be used by configuration selector 244 to select the configuration of processing resources 208 in data processing component 206 that is to be used to process data packets 204. Configuration selector 244 may first determine whether workload demand 226 indicates that a change in current configuration 225 of processing resources 208 in data processing component 206 is desirable. For example, an increasing number of data packets 204 to be processed by data processing system 200 may indicate that the number of data processing resources 208 to be used to process data packets 204 should be increased. As another example, a decreasing number of data packets 204 to be processed by data processing system 200 may indicate that the number of data processing resources 208 to be used to process data packets 204 may be reduced. In this case, data processing resources 208 that are no longer needed for processing data packets 204 may be turned off to reduce energy consumption by data processing system 200.

Configuration selector 244 may select new configuration 245 for processing resources 208 in data processing component 206 in response to a determination by configuration selector 244 that a change to the current configuration of data processing resources 208 is called for due to a change in workload demand 226. Configuration selector 244 may select new configuration 245 for processing resources 208 from a number of pre-defined configurations 246. Configuration selector 244 may select new configuration 245 from pre-defined configurations 246 based on both workload demand 226 and metric values 224.

Even if a change in workload demand 226 does not indicate that a change in configuration of processing resources 208 in data processing component 206 is required, configuration selector 244 may determine that current configuration 225 is not satisfying desirable performance characteristics as well as another available configuration. This determination may be made by configuration selector 244 using metric values 224 provided by metric identifier 222. For example, configuration selector 244 may determine that a change in current configuration 225 is desirable when one or more metric values 224, or combinations of metric values 224, satisfy threshold condition 249. In this case, configuration selector 244 may select new configuration 245 for processing resources 208 from pre-defined configurations 246.

Configuration selector 244 may use one or more metric values 224 to select new configuration 245 from pre-defined configurations 246. For example, pre-defined configurations 246 may be associated with corresponding metric values 224, or ranges of metric values 224, using configuration table 248 or another appropriate data structure. In this case, configuration selector 244 may select the appropriate new configuration 245 by using one or more metric values 224 to identify one of pre-defined configurations 246 that corresponds to those one or metric values 224 in configuration table 248.

In any case, when new configuration 245 for processing resources 208 in data processing component 206 is selected by configuration selector 244, new configuration 245 may be implemented in data processing component 206 by change configuration function 250. For example, change configuration function 250 may turn on processing resources 208 or groups of processors 214 in data processing component 206 and turn off processing resources 208 or groups of processors 214 in data processing component 206 as necessary to implement new configuration 245. Change configuration function 250 also may change the mode of operation of one or more active processing resources 208 in data processing component 206 to implement new configuration 245. The effect of implementing new configuration 245 in data processing component 206 is to replace current configuration 225 with new configuration 245. Thus, new configuration 245 becomes the new current configuration 225. Data packet distribution function 227 then may distribute data packets 204 to processing resources 208 for processing in accordance with new configuration 245 as data packets 204 are received for processing.

The illustration of data processing system 200 in FIG. 2 has been presented for illustrating one manner in which network data packet processing may be implemented in accordance with one illustrative embodiment. This illustration is not meant to imply limitations to the manner in which network data packet processing may be implemented in other illustrative embodiments.

For example, illustrative embodiments may be used to select the configuration of processing resources in a data processing component to improve any processing characteristic associated with the processing of data packets by the data processing component. In one example, without limitation, the processing characteristic to be improved may be energy efficiency. However, illustrative embodiments may be used to improve other processing characteristics associated with the processing of data packets, such as performance, reliability, or other processing characteristics or combinations of characteristics.

In accordance with an illustrative embodiment, calculation factors 228 and factor weightings 242 used to calculate metric values 224 and threshold condition 249 may be selected based on the performance characteristics that are of interest for a particular application. Different performance characteristics may be of interest for different processing resources 208 or groups of processors 214 in data processing component 206. Thus, in some cases, metric values 224 for different processing resources 208 or groups of processors 214 in data processing component 206 may be identified using different calculation factors 228, factor weightings 242, or both in various combinations.

Figure 3:
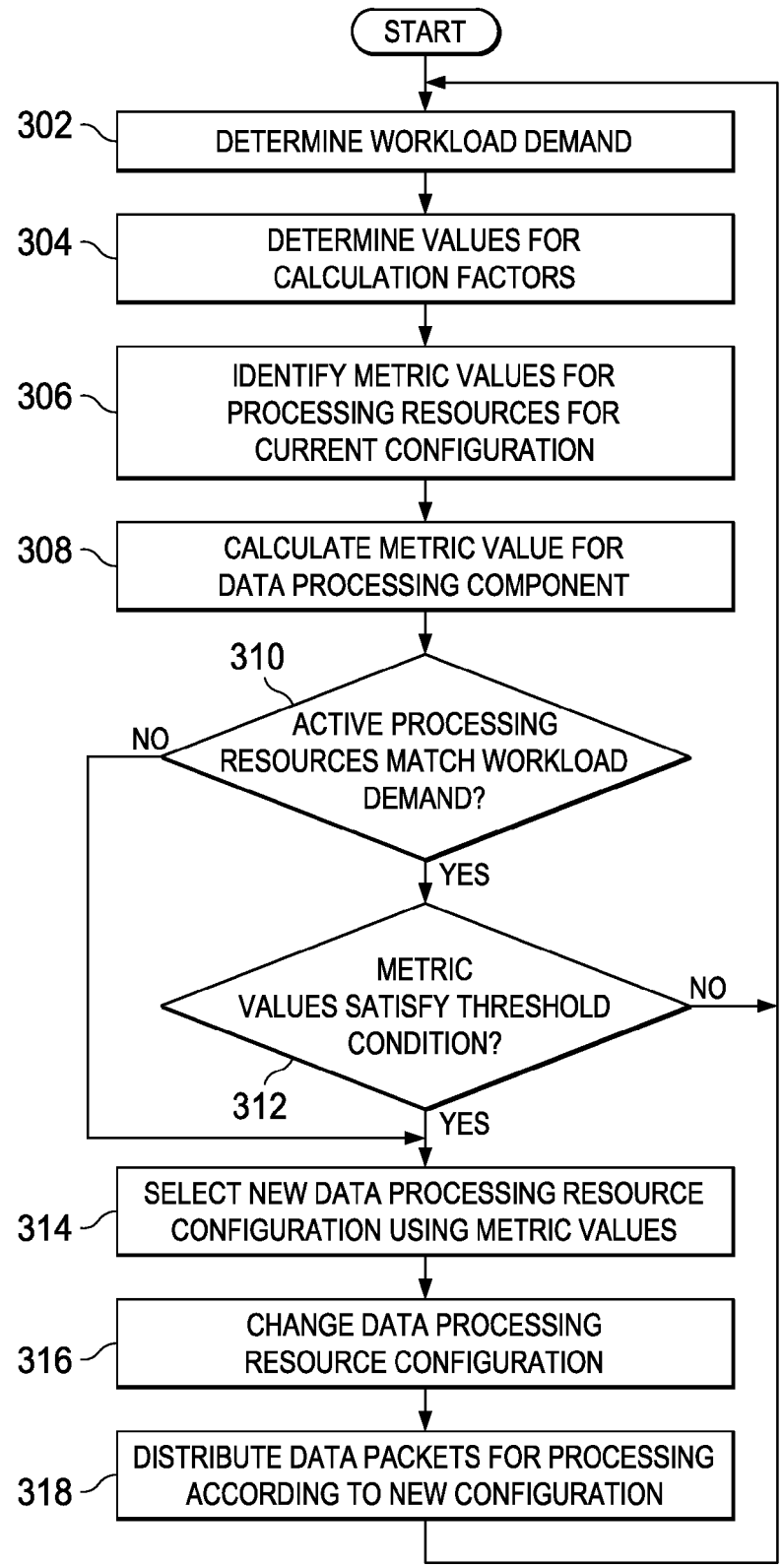
FIG. 3 is an illustration of a flowchart of a process for providing data packet processing in accordance with an illustrative embodiment.

Turning now to FIG. 3, an illustration of a flowchart of a process for providing data packet processing is depicted in accordance with an illustrative embodiment. For example, the process of FIG. 3 may be implemented in data packet distributor 218 for distributing data packets 204 for processing by data processing component 206 in FIG. 2. The example process illustrated in FIG. 3 is directed to improving the energy efficiency of data packet processing by a data processing component. Variations in the process illustrated in FIG. 3 may be used to improve other processing characteristics associated with the processing of data packets by the processing resources in a data processing component. The process illustrated in FIG. 3 assumes that processing resources of a data processing component are configured in a current configuration for processing data packets. In the current configuration, some of the processing resources on the data processing component are turned on or active while other processing resources on the data processing component may be inactive and turned off.

The process begins by determining workload demand (operation 302). Operation 302 may include determining both the workload demand for individual processing resources or groups of processors in a data processing component, as well as the workload demand for the data processing component as a whole. Values for calculation factors also are determined (operation 304). For example, without limitation, operation 304 may include determining values for the temperature of processing resources on the data processing component, resource contention of the processing resources, values related to wear-out of the processing resources, inherent performance efficiency of the processing resources, or other factors or combinations of factors.

Metric values for individual processing resources or groups of processors for the current configuration are then identified (operation 306). The metric values may be identified using the workload demand identified in operation 302 and the calculation factor values identified in operation 304 in any appropriate combination. The metric values may be identified using selected factor weightings. The factor weightings may be used to identify the importance or priority of the workload demand and other calculation factors for a particular application.

For example, without limitation, operation 306 may identify metric value $E_R$ for a processing resource or group of processing resources in the data processing component using the following formula:

$$E_R = V/(t1*T_{prox} + w2*WL_{prox} + c3*C_{prox} + w4*WO_{prox}).$$

$T_{prox}$ is a temperature proxy value that may be calculated as $T_{prox} = e^{(\Sigma Tn/N)} * T_{max}$. This factor may be based on the average temperature reading of the region of an integrated circuit chip in which the processing resources are implemented. The average temperature reading may be obtained from a temperature sensor on the chip. The average temperature is weighted with the maximum temperature. The exponential factor represents the exponential dependency of leakage or static power on temperatures as a metric for energy efficiency.

$WL_{prox}$ is a workload demand proxy value that may be calculated as $WL_{prox}$ = queue length at processing resource/estimated network traffic. This factor is calculated by taking into account the overall network traffic load and the portion of the total workload that is directed to the processing resource.

$C_{prox}$ is a resource contention proxy value that may be calculated as $C_{prox}$ = f(cache and functional unit content). This factor is calculated by estimating resource contention at the processing resource using wait times or cache latency at the cache memory associated with the processing resource.

$WO_{prox}$ is a wear-out proxy value that may be calculated as $WO_{prox}$ = Number of Cycles ((Hardware Counter>Activity Threshold) AND ($T_{max} > T_{threshold}$))/Chip $WO_{Avg}$. This factor may be calculated based on the number of cycles that the processing resource is in high activity and at high temperature compared to the rest of the chip. High activity may be identified by comparing the output of a hardware counter to an activity threshold. High temperature may be identified by comparing temperature information provided by a temperature sensor on the chip to a temperature threshold.

V is a value indicating the inherent performance efficiency of the processing resource. This factor allows the different inherent quality of processing resources on the processing resource to be taken into account.

t1, w2, c3, and w4 are weightings for the various calculation factors. These weightings may be selected to reflect the particular importance or priority of individual factors for any particular application. For example, if wear-out is not important in a particular application w4 may be set to 0.

In this example, a high value for $E_R$ is preferred. A high value for $E_R$ indicates that temperatures are low, queues are relatively empty, wear-out is low, and contention is low in a processing resource.

A metric value for the data processing component then may be calculated (operation 308). The metric value for the data processing component may be calculated from the metric values for the processing resources that were identified in operation 306.

For example, without limitation, the metric value $E_{chip}$ for the data processing component may be calculated as $E_{chip} = \Sigma E_{R(Active\ Resources)} / \Sigma E_{R(CompatibleInactiveResources)}$, where both $\Sigma E_{R(Active\ Resources)}$ and $\Sigma E_{R(CompatibleInactiveResources)}$ are normalized to the number of resources in the data processing component.

It then may be determined whether the active processing resources in the current configuration match the current workload demand (operation 310). If the current configuration does not match the current demand, a new data processing resource configuration is selected using one or more of the identified metric values (operation 314). For example, operation 314 may include using one or more metric values to select a new configuration from a number of pre-defined configurations. The current data processing resource configuration then may be changed to the newly selected configuration (operation 316). Data packets then may be distributed to processing resources in accordance with the new configuration as the data packets are received (operation 318), with the process repeating thereafter.

If it is determined in operation 310 that the current does match the current workload demand, then it may be determined whether the identified metric values satisfy a threshold condition (operation 312). Target values for the threshold conditions may be set regionally at processor group level as well as at chip level based on the processing conditions of interest in any particular application. In this example, it may be determined at operation 312 that the threshold condition is satisfied if $E_{chip} < 1$. In this case, the metric value indicates that energy efficiency can be improved by changing the current configuration to a new configuration. If the threshold condition is satisfied, the process may continue with selecting a new data processing resource configuration using one or more of the identified metric values in operation 314. Otherwise the process may return to operation 302 to be repeated.

Thus, the illustrative embodiments provide a method and apparatus for improving processing characteristics associated with the processing of network data packets by a data processing component including multiple processing resources. Various relevant metric values for the data processing component are identified repeatedly during run time as data packets are received and processed by the data processing component. Data from sensors on the data processing component may be used to identify values for various factors that are used to identify the metric values. Pre-determined configurations for directing data packets to the data processing resources of the data processing component for various ranges of metric values are provided. The pre-determined configurations may utilize the locations of the structures on an integrated circuit chip or other data processing component to maximize the efficiency of the configuration. Illustrative embodiments provide for a careful selection of active and idle processing resources to minimize peak temperatures, reduce static power dissipation, and improve the overall efficiency of the system by improving the utilization and bandwidth to shared resources, such as shared caches. The metrics identified during run time, as well as dynamic network traffic assessment, may be used to select the appropriate configuration for directing data packets to those processing resources of the data processing component that will result in improved processing characteristics.

For example, without limitation, one or more of the illustrative embodiments provides a capability to lower the operating temperature and the static power dissipation of a data processing component for processing of data packets in a network. As a result, higher energy efficiency for processing the data packets by the data processing component is achieved. Wear-out characteristics of the data processing component also are improved, thereby increasing the useful life of the data processing component.

Figure 4:
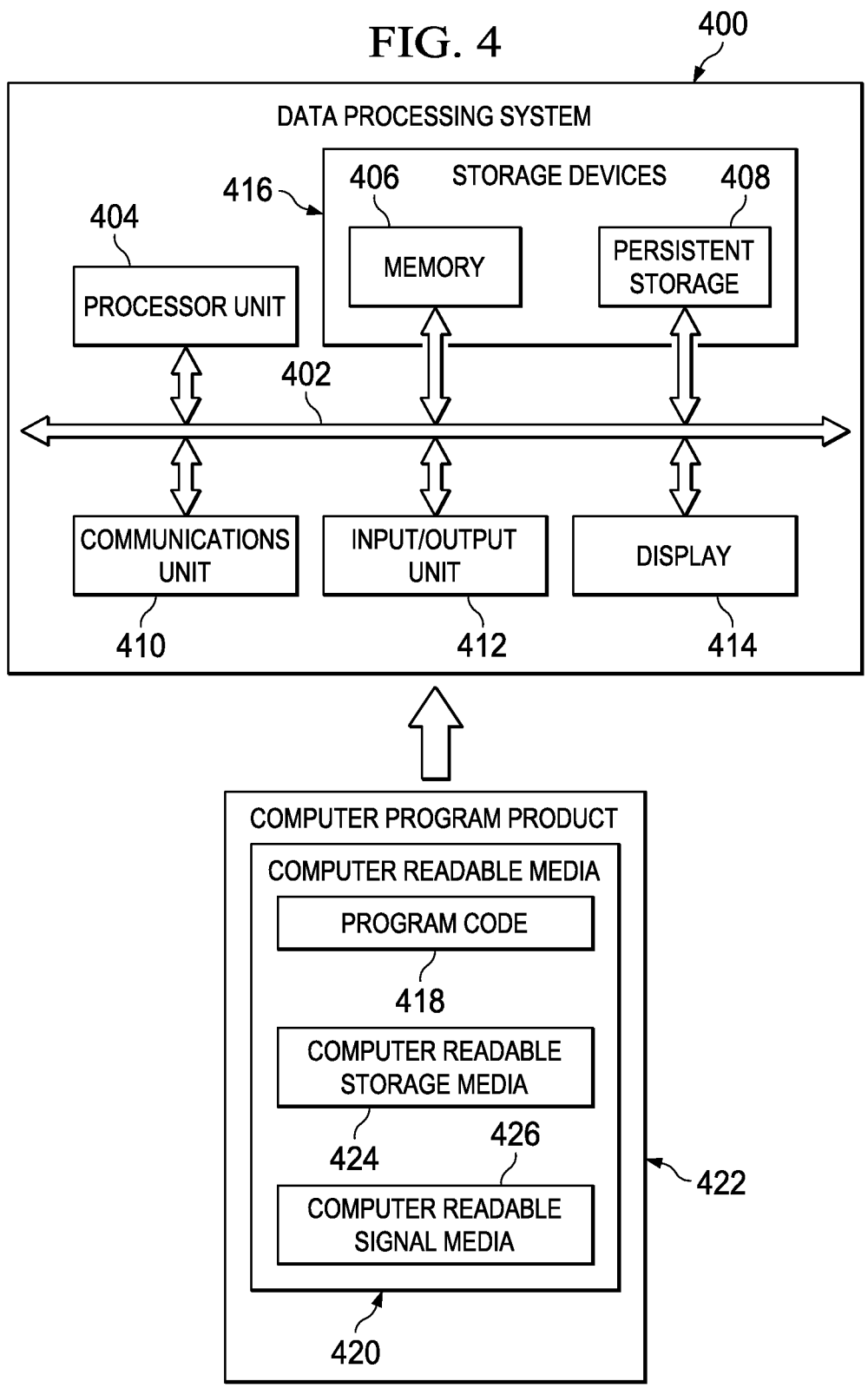
FIG. 4 is an illustration of a data processing system in accordance with an illustrative embodiment.

Turning now to FIG. 4, an illustration of a data processing system is depicted in accordance with an illustrative embodiment. In this example, data processing system 400 is one example of data processing system 200 in FIG. 2. In this illustrative example, data processing system 400 includes communications fabric 402, which provides communications between processor unit 404, memory 406, persistent storage 408, communications unit 410, input/output (I/O) unit 412, and display 414.

Processor unit 404 serves to process instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for processing by processor unit 404. The processes of the different embodiments may be performed by processor unit 404 using computer-implemented instructions, which may be located in a memory, such as memory 406.

These instructions are referred to as program instructions, program code, computer usable program code, or computer readable program code that may be read and processed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for processing by processor unit 404. Program code 418 and computer readable media 420 form computer program product 422 in these examples. In one example, computer readable media 420 may be computer readable storage media 424 or computer readable signal media 426.

Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400.

In some instances, computer readable storage media 424 may not be removable from data processing system 400. In these examples, computer readable storage media 424 is a physical or tangible storage device used to store program code 418 rather than a medium that propagates or transmits program code 418. Computer readable storage media 424 is also referred to as a computer readable tangible storage device or a computer readable physical storage device. In other words, computer readable storage media 424 is a media that can be touched by a person.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 418 may be omitted, because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 406, or a cache, such as found in an interface and memory controller hub that may be present in communications fabric 402.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language, such as Java, Smalltalk, C++, or the like, and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which run on the computer or other programmable apparatus provide processes for implementing the functions/acts specified in the flowchart and/or block diagram block or blocks.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the block may occur out of the order noted in the figures. For example, in some cases, two blocks shown in succession may be processed substantially concurrently, or the blocks may sometimes be processed in the reverse order, depending upon the functionality involved. Also, other blocks may be added in addition to the illustrated blocks in a flowchart or block diagram.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or to limit the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for processing data packets, comprising:
identifying a metric value for a current configuration of processing resources in a data processing component that is processing the data packets, wherein the metric value is identified by selectively weighting a workload demand of the processing resources, a temperature of the processing resources, a resource contention for the processing resources, a wear-out of the processing resources, locations of the processing resources, an interconnectivity of the processing resources, and an inherent resource performance efficiency of the processing resources, and wherein the metric value is further identified according to a formula of:

$$E_R = V/(t1 * T_{prox} + w2 * WL_{prox} + c3 * C_{prox} + w4 * WO_{prox}),$$

wherein:
$T_{prox}$ is a temperature proxy value;
$WL_{prox}$ is a workload demand proxy value;
$C_{prox}$ is a resource contention proxy value;
$WO_{prox}$ is a wear-out proxy value;

V is a value indicating an inherent performance efficiency of the processing resource; and t1, w2, c3, and w4 are weighting factors;

selecting a new configuration of the processing resources in the data processing component using the metric value;

changing the current configuration of the processing resources in the data processing component to the new configuration; and distributing the data packets to the new configuration of the processing resources for processing as the data packets are received.

2. The method of claim 1, wherein the data processing component is a multi-core processor and the processing resources are cores on the multi-core processor.

3. The method of claim 1, wherein the processing resources comprise groups of processors on the data processing component.

4. The method of claim 1, wherein the metric value comprises a number of values for the processing resources and a value for the data processing component.

5. The method of claim 1, wherein the metric value comprises a first metric value for a first one of the processing resources that is calculated using first factors and a second metric value for a second one of the processing resources that is calculated using second factors, wherein the first factors are different from the second factors.

6. The method of claim 1, wherein selecting the new configuration comprises selecting the new configuration from a group of pre-defined configurations.

7. The method of claim 1, further comprising:
determining whether the current configuration of the processing resources in the data processing component is appropriate for a current workload on the data processing component; and
selecting the new configuration in response to a determination that the current configuration of the processing resources in the data processing component is not appropriate for the current workload.

8. The method of claim 7, further comprising selecting the new configuration using the metric value and based on the current workload.

9. The method of claim 1, further comprising:
determining whether the metric value satisfies a threshold condition; and
selecting the new configuration in response to a determination that the metric value satisfies the threshold condition.

10. An apparatus, comprising:
a data processing component comprising processing resources configured to process data packets; and
a data packet distributor configured to:
identify a metric value for a current configuration of the processing resources in the data processing component that is processing the data packets, wherein the metric value is identified by selectively weighting a workload demand of the processing resources, a temperature of the processing resources, a resource contention for the processing resources, a wear-out of the processing resources, locations of the processing resources, an interconnectivity of the processing resources, and an inherent resource performance efficiency of the processing resources, and wherein the metric value is further identified according to a formula of:

$$E_R = V/(t1 * T_{prox} + w2 * WL_{prox} + c3 * C_{prox} + w4 * WO_{prox}),$$

wherein:

$T_{prox}$ is a temperature proxy value;

$WL_{prox}$ is a workload demand proxy value;

$C_{prox}$ is a resource contention proxy value;

$WO_{prox}$ is a wear-out proxy value;

V is a value indicating an inherent performance efficiency of the processing resource; and t1, w2, c3, and w4 are weighting factors;

select a new configuration of the processing resources in the data processing component using the metric value;

change the current configuration of the processing resources in the data processing component to the new configuration; and distribute the data packets to the new configuration of the processing resources for processing as the data packets are received.

11. The apparatus of claim 10, wherein the data processing component is a multi-core processor and the processing resources are cores on the multi-core processor.

12. The apparatus of claim 10, wherein the processing resources comprise groups of processors on the data processing component.

13. The apparatus of claim 10, wherein the metric value comprises a number of values for the processing resources and a value for the data processing component.

14. The apparatus of claim 10, wherein the metric value comprises a first metric value for a first one of the processing resources that is calculated using first factors and a second metric value for a second one of the processing resources that is calculated using second factors, wherein the first factors are different from the second factors.

15. The apparatus of claim 10, wherein the data packet distributor is configured to select the configuration from a group of pre-defined configurations.

16. The apparatus of claim 10, wherein the data packet distributor is further configured to:
determine whether the current configuration of the processing resources in the data processing component is appropriate for a current workload on the data processing component; and
select the new configuration in response to a determination that the current configuration of the processing resources in the data processing component is not appropriate for the current workload using the metric value and based on the current workload.

17. The apparatus of claim 10, wherein the data packet distributor is configured to:
determine whether the metric value satisfies a threshold condition; and
select the new configuration in response to a determination that the metric value satisfies the threshold condition.

18. A non-transitory computer readable storage medium having a computer program product encoded thereon for processing data packets, comprising:
first program instructions for identifying a metric value for a current configuration of processing resources in a data processing component that is processing the data packets, wherein the metric value is identified by selectively weighting a workload demand of the processing resources, a temperature of the processing resources, a resource contention for the processing resources, a wear-out of the processing resources, locations of the processing resources, an interconnectivity of the processing resources, and an inherent resource performance efficiency of the processing resources, and wherein the metric value is further identified according to a formula of:

$$E_R = V/(t1*T_{prox}+w2*WL_{prox}+c3*C_{prox}+w4*WO_{prox}),$$

wherein:
- $T_{prox}$ is a temperature proxy value;
- $WL_{prox}$ is a workload demand proxy value;
- $C_{prox}$ is a resource contention proxy value;
- $WO_{prox}$ is a wear-out proxy value;
- V is a value indicating an inherent performance efficiency of the processing resource; and
- t1, w2, c3, and w4 are weighting factors;

second program instructions for selecting a new configuration of the processing resources in the data processing component using the metric value;
third program instructions for changing the current configuration of the processing resources in the data processing component to the new configuration;
fourth program instructions for distributing the data packets to the new configuration of the processing resources for processing as the data packets are received; and
wherein the first program instructions, the second program instructions, the third program instructions, and the fourth program instructions are stored on the non-transitory computer readable storage medium.

19. The method of claim 1, further comprising:
identifying the metric value for the current configuration of the processing resources in the data processing component that is processing the data packets, wherein:
- $T_{prox}$ is calculated as $T_{prox}=e^{(\Sigma Tn/N)}*T_{max}$;
- $WL_{prox}$ is calculated as $WL_{prox}$=queue length at processing resource/estimated network traffic;
- $C_{prox}$ is calculated as $C_{prox}$=f(cache and functional unit content); and
- $WO_{prox}$ is calculated as $WO_{prox}$=Number of Cycles ((Hardware Counter>Activity Threshold) AND $(T_{max}>T_{threshold}))$/Chip $WO_{Avg}$.

20. The apparatus of claim 10, wherein the data packet distributor is configured to:
identify the metric value for the current configuration of the processing resources in the data processing component that is processing the data packets, wherein:
- $T_{prox}$ is calculated as $T_{prox}=e^{(\Sigma Tn/N)}*T_{max}$;
- $WL_{prox}$ is calculated as $WL_{prox}$=queue length at processing resource/estimated network traffic;
- $C_{prox}$ is calculated as $C_{prox}$=f(cache and functional unit content); and
- $WO_{prox}$ is calculated as $WO_{prox}$=Number of Cycles ((Hardware Counter>Activity Threshold) AND $(T_{max}>T_{threshold}))$/Chip $WO_{Avg}$.

* * * * *